United States Patent [19]

Yamato

[11] Patent Number: 5,222,319
[45] Date of Patent: Jun. 29, 1993

[54] FISHING ROD WITH REEL HOLDING PORTION

[75] Inventor: Yoshiro Yamato, Shimonoseki, Japan

[73] Assignee: Shimano, Inc., Osaka, Japan

[21] Appl. No.: 777,648

[22] Filed: Oct. 16, 1991

[30] Foreign Application Priority Data

Oct. 19, 1990 [JP] Japan .................. 2-282476

[51] Int. Cl.⁵ .................................. A01K 87/06
[52] U.S. Cl. .............................. 43/22; 43/23
[58] Field of Search ................. 43/22, 23, 18.1

[56] References Cited

U.S. PATENT DOCUMENTS

| | | | |
|---|---|---|---|
| 1,970,348 | 8/1934 | Turano | 43/22 |
| 2,409,940 | 10/1946 | Kay | 43/22 |
| 4,133,133 | 1/1979 | Cassef | 43/22 |
| 4,398,369 | 8/1983 | Wiebe. | |
| 4,516,351 | 5/1990 | Highby. | |
| 4,577,432 | 3/1986 | Brackett et al. | |
| 4,601,127 | 7/1986 | Maeda. | |
| 4,644,680 | 2/1987 | Dawson. | |
| 4,649,661 | 3/1987 | Myojo. | |
| 4,693,029 | 9/1987 | Yamamoto et al. | |
| 4,762,584 | 8/1988 | Andreasen et al. | |
| 4,821,447 | 4/1989 | Nakayama | 43/22 |
| 4,903,427 | 2/1990 | Yamato | 43/22 |
| 4,920,682 | 5/1990 | Andreasen et al. | |
| 5,048,223 | 9/1991 | Yamamoto et al. | 43/22 |

FOREIGN PATENT DOCUMENTS 0466521 5/1937 United Kingdom ............. 43/22

*Primary Examiner*—Richard K. Seidel
*Assistant Examiner*—James Miner
*Attorney, Agent, or Firm*—Dickstein, Shapiro & Morin

[57] ABSTRACT

An improved fishing rod with a reel holding portion having a front hood and rear hood for engaging a pole mount of a reel. The fishing rod comprises a forming portion for the front hood and a forming portion for the rear hood. These forming portions have larger diameters than a rod material and are provided independently from each other. The fishing rod further comprises an entirely exposed intermediate portion defined at a middle portion between the forming portions and having a smaller diameter than both of the forming portions.

6 Claims, 2 Drawing Sheets

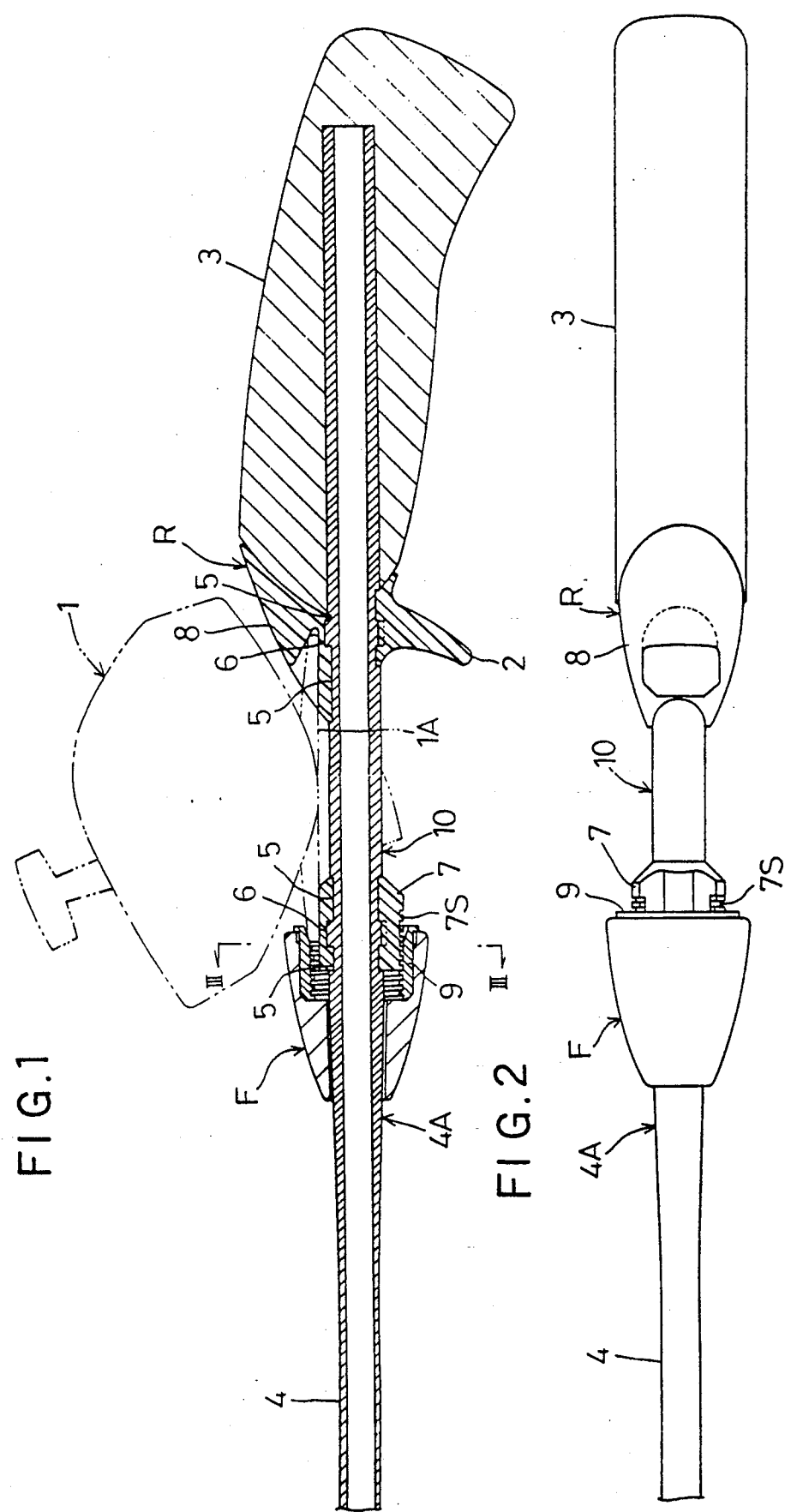

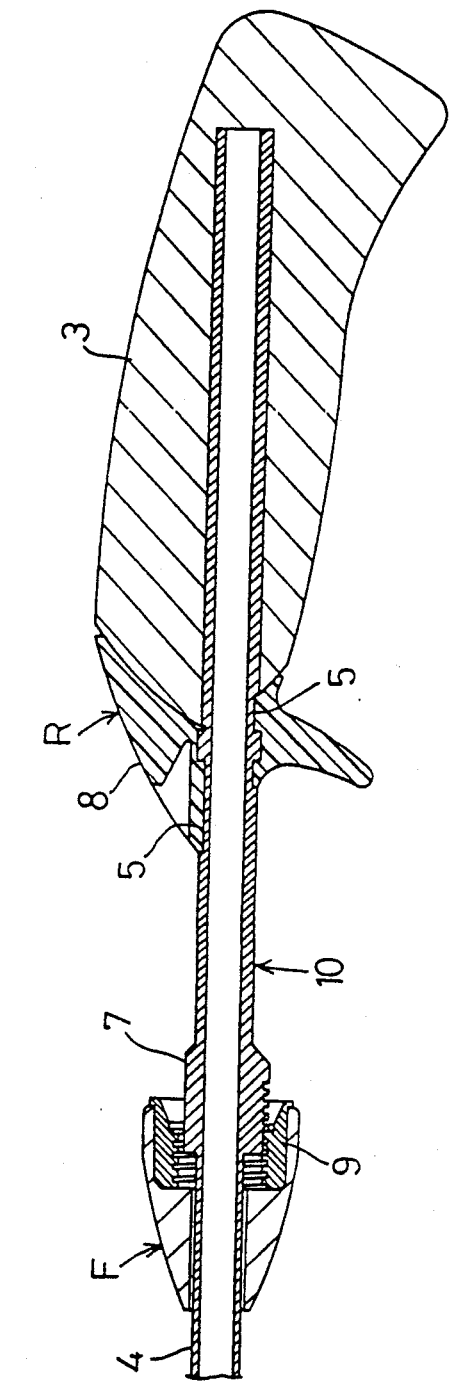
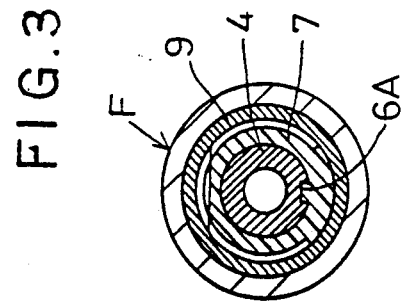

FISHING ROD WITH REEL HOLDING PORTION

BACKGROUND OF THE INVENTION

1. Field of the Invention

The present invention relates to an improved fishing rod with a reel holding portion, and more particularly with a reel holding portion having a front hood and a rear hood for engaging a mount pole of a reel.

2. Description of the Related Art

A lure rod as an example of the fishing rods as structured above is disclosed in Japanese Utility Model Application "Kokai" No. 1-155361 in which large diameter portions are defined in part of a rod material by thickening the material for providing the front and rear hoods.

In lure fishing requiring the angler to frequently repeat casting and reeling of a trick device, the angler effects what we call a "palming", i.e. grips the rod and reel together.

Such a palming is performed in fishing using baitcasting reels. In doing the palming, the angler places his or her thumb positioned away from a handle of the reel to a thumb rest mounted in an upper portion of the reel, and at the same time places other fingers to a lower surface of a reel seat, thereby to embrace the reel and rod by palm.

However, in the conventional structures as noted above, the angler of small hands cannot sufficiently hold the lower surface of the reel seat, which results in an unsteady palming.

During the palming, the angler would sense a strike with his or her hand doing the palming. With the conventional structures, a vibration of such a strike is weakened due to the material defining the larger diameter portions, and then transmitted to the angler's fingers, as a result which it is sometimes difficult to sense a very subtle bite.

In view of this, it would be suggested to form the reel seat by attaching the front and rear hoods directly to the rod. However, such a reel holding portion directly defined in the rod not only tends to mar the rod, but also makes it difficult to attach the hood to a small diameter rod, e.g. the lure rod.

It would be also suggested to adhere the front and rear hoods to the rod. However, such a rod cannot have a sufficient strength against a clamping stress produced when the reel is attached, and the adhered portion possibly peels off during the use of the rod.

SUMMARY OF THE INVENTION

A primary object of the present invention is to provide a fishing rod having a sufficient strength with which the angler can easily effect a palming and sense a subtle strike.

In order to fulfill the above-noted object, the present invention is characterized by an improved fishing rod in which a forming portion of the front hood and a forming portion of the rear hood are defined independently from each other and have larger diameters than a rod material, and an entirely exposed intermediate portion is defined at a middle portion between the forming portions and has a smaller diameter than both of the forming portions.

This structure has the following functions and effects.

Referring to FIGS. 1 through 3, since the intermediate portion 10 has a smaller diameter, and a distance in a straight line from an upper face of the reel 1 to a lower face of the intermediate portion 10 is reduced compared with the conventional structures, the angler's fingers easily reach the intermediate portion during the palming. The entirely exposed intermediate portion allows the angler to contact a larger part of his or her fingers or palm with the intermediate portion 10 to sense a strike. In addition, the fishing rod according to the present invention does not tend to weaken the strike as compared with conventional structures.

In other words, a simple improvement of separately defining the two large diameter portions for forming the real seat can perform effective functions as described above.

Thus, the present invention can realize a fishing rod having a sufficient strength with which the angler of small hands can easily effect the palming and sense a subtle strike.

Other objects, features and advantages of the invention will be apparent from the following detailed description referring to the accompanying drawings.

BRIEF DESCRIPTION OF THE DRAWINGS

The drawings illustrate a fishing rod embodying the present invention, in which:

FIG. 1 is a sectional view of a reel holding portion of a lure rod;

FIG. 2 is a plan view of the reel holding portion of the lure rod;

FIG. 3 is a section taken along a line 3—3; and

FIG. 4 is a sectional view of a reel holding portion according to another embodiment of the present invention.

DETAILED DESCRIPTION OF THE PREFERRED EMBODIMENTS

A fishing rod embodying the present invention will be described in detail referring to the drawings.

FIGS. 1 and 2 illustrate a grip portion of a lure rod, respectively. The lure rod includes a reel holding portion having a movable front hood F and a stationary rear hood R for engaging a pole mount 1A of the reel 1. A trigger 2 is formed integrally with the rear hood R, and a grip 3 is mounted rearwardly of the rear hood R.

The rod defines a thick portion 4A which is slightly thicker than a material 4 of the rod. Flange portions 6 are independently defined at two positions in the thick portion 4A, each flange portion being sandwiched between a pair of restricted portions 5. The front flange portion 6 is united with a forming portion 7 of the front hood F, and the rear flange portion 6 is united with a forming potion 8 of the rear hood R by injection molding using unillustrated molds.

In the lure rod of this type, the rear hood R is stationary to be integral with the forming portion 8. A nut 9 is integrally formed with the front hood F, while a threaded portion 7S to which the nut 9 is screwed are defined in the forming portion 7 of the front hood F by injection molding. Each flange portion 6 defines a cut-out portion 6A for locking the front hood or rear hood against rotation.

In this lure rod, at a position an entirely exposed intermediate portion 10 having a smaller diameter than the forming portions 7 and 8. This enables the angler to do a palming easily and sense a subtle strike.

Referring to FIG. 4 apart from the foregoing embodiment, the forming portion 7 of the front hood F may be formed integrally with the same material as the rod material 4.

In the latter embodiment, the rear hood R has the same structure as that of the foregoing embodiment. The like numbers are allotted to any members performing the like functions through the embodiments.

Further, the front hood may be stationary while the rear hood may be movable. The structure of the movable hood is not limited. The present invention can be applied to other rods than the lure rods.

What is claimed is:

1. A fishing rod comprising:
   a rod body;
   a grip integrally provided on an end portion of said rod body;
   a reel mounting mean including,
   a rear retaining means for retaining a rear portion of a reel foot, said rear retaining means being attached to a front portion of said grip and being non-rotatable and non-slidable with respect to said rod body, and said rear retaining means having a rear stage portion including a rear stage plane on which a rear portion of a reel foot is mountable, and
   a front retaining means for retaining a front portion of a reel foot, said front retaining means further comprising a front stage portion and a front cap, said front retaining means being provided in spaced relation longitudinally of said rod body with respect to said rear retaining means, said front stage portion being non-rotatably and non-slidably attached to said rod body, said front stage portion including a front stage plane on which a front portion of a reel foot is mountable;
   said front cap being threadably engaged to said front stage portion, so that a reel foot can be clamped to said rod body by screwing said front cap against said front stage;
   said rod body being exposed to permit a direct touch thereof by an angler's hand within a space formed between said rear retaining means and said front retaining means; and
   wherein a thickness direction enlarged portion is formed at a rear portion of said rod body, and said rear retaining means is formed on a rod body portion including a first pair of recesses circumferentially formed in spaced relation with each other on a mid portion of said thickness enlarged portion, said front stage portion being formed on a rod portion including a second pair of recesses also circumferentially formed in spaced relation with each other on said mid portion of said thickness enlarged portion, said second pair of recesses being formed forwardly of said first pair of recesses in a spaced relation with respect thereto.

2. A fishing rod as claimed in claim 1, wherein a thickness direction enlarged portion is formed at a rear portion of said rod body, and at least two recesses are formed at a mid portion of said thickness enlarged portion, said rear retaining means being immovably formed on one of said recesses and said front stage portion being immovably formed on another one of said recesses.

3. A fishing rod as claimed in claim 2, wherein said rear retaining means and said front stage portion are formed onto said rod body as a molded synthetic resin material.

4. A fishing rod as claimed in claim 1, wherein said front stage portion is integrally formed onto said rod body with a material identical to that forming said rod body.

5. A fishing rod as claimed in claim 1, wherein said rear retaining means and said front stage portion are formed onto said rod body as a molded synthetic-resin material.

6. A fishing rod as claimed in claim 1, wherein a first indent is formed on a rod body portion left between said first pair of recesses and a second indent is formed on a rod body portion left between said second pair of recesses, each of said first and second indents preventing said rear retaining means and front stage portion from rotating around said rod body respectively.

* * * * *